(12) United States Patent
Tomiyama

(10) Patent No.: US 9,506,547 B2
(45) Date of Patent: Nov. 29, 2016

(54) LOCK-UP DEVICE FOR FLUID TYPE POWER TRANSMISSION DEVICE

(75) Inventor: Naoki Tomiyama, Hirakata (JP)

(73) Assignee: EXEDY Corporation, Osaka (JP)

( * ) Notice: Subject to any disclaimer, the term of this patent is extended or adjusted under 35 U.S.C. 154(b) by 188 days.

(21) Appl. No.: 13/879,707

(22) PCT Filed: Aug. 23, 2011

(86) PCT No.: PCT/JP2011/068918
§ 371 (c)(1),
(2), (4) Date: Apr. 16, 2013

(87) PCT Pub. No.: WO2012/053280
PCT Pub. Date: Apr. 26, 2012

(65) Prior Publication Data
US 2013/0206529 A1     Aug. 15, 2013

(30) Foreign Application Priority Data

Oct. 19, 2010  (JP) .................................. 2010-234338

(51) Int. Cl.
*F16H 45/02*   (2006.01)
*F16F 15/139*  (2006.01)
*F16F 15/14*   (2006.01)

(52) U.S. Cl.
CPC ........... *F16H 45/02* (2013.01); *F16F 15/1428* (2013.01); *F16F 15/139* (2013.01); *F16F 15/145* (2013.01); *F16H 2045/0205* (2013.01); *F16H 2045/0226* (2013.01)

(58) Field of Classification Search
CPC ................ F16H 2045/0263; F16H 2045/0268
USPC .................... 192/3.28, 3.29, 3.31, 3.33, 201; 464/68.2, 68.4; 74/574.2, 574.3
See application file for complete search history.

(56) References Cited

U.S. PATENT DOCUMENTS

| 2,102,524 | A | * | 12/1937 | Fieux ...................... 192/105 CE |
| 3,519,112 | A | * | 7/1970  | Verzolla ...................... 192/3.31 |
| 4,580,668 | A | * | 4/1986  | Pickard ................... F16H 45/02 192/3.29 |
| 4,800,996 | A | * | 1/1989  | Loizeau ........................ 192/201 |
| 4,982,821 | A | * | 1/1991  | Tanaka .................... F16H 45/02 192/214.1 |
| 5,195,621 | A | * | 3/1993  | Dull ........................ F16H 45/02 192/3.29 |
| 6,026,940 | A | * | 2/2000  | Sudau .......................... 192/3.28 |
| 6,408,717 | B1 | * | 6/2002 | Young et al. ................ 74/433.5 |
| 8,161,740 | B2 | * | 4/2012 | Krause et al. .................. 60/338 |

(Continued)

FOREIGN PATENT DOCUMENTS

| JP | 2007-024254 A | 2/2007 |
| JP | 2009-197889 A | 9/2009 |
| JP | 2009-293671 A | 12/2009 |

*Primary Examiner* — Robert Hodge
*Assistant Examiner* — Ryan Dodd
(74) *Attorney, Agent, or Firm* — Global IP Counselors, LLP

(57) ABSTRACT

It is intended to inhibit variation in output-side rotation in a wide rotational speed range even when a lock-up rotational speed is set to be low. The present lock-up device includes: a piston configured to be pressed onto a front cover; an output-side unit disposed to be unitarily rotatable with a turbine; and a first torsion spring elastically coupling the piston and the output-side unit. The output-side unit includes: an output member fixed to the turbine; an inertia member disposed to be rotatable relatively to the output member; a second torsion spring elastically coupling the inertia member and the output member; and a hysteresis torque generating mechanism. The hysteresis torque generating mechanism is configured to generate variable hysteresis torque while being disposed between the inertia member and the output member.

6 Claims, 8 Drawing Sheets

(56) References Cited

U.S. PATENT DOCUMENTS

| | | | |
|---|---|---|---|
| 8,403,762 B2* | 3/2013 | Steinberger | 464/68.1 |
| 8,695,771 B2* | 4/2014 | Matsuoka et al. | 192/3.29 |
| 2004/0216979 A1* | 11/2004 | Yamashita | F16F 15/12366 192/212 |
| 2005/0023103 A1* | 2/2005 | Mizukami | F16F 15/12313 192/213.2 |
| 2007/0251788 A1* | 11/2007 | Heck | F16H 45/02 192/3.3 |
| 2007/0284207 A1* | 12/2007 | Kneidel | F16H 45/02 192/3.29 |
| 2010/0269497 A1* | 10/2010 | Engelmann et al. | 60/338 |
| 2011/0192692 A1* | 8/2011 | Werner et al. | 192/3.29 |
| 2012/0080282 A1* | 4/2012 | Takikawa et al. | 192/3.28 |
| 2012/0111684 A1* | 5/2012 | Kombowski et al. | 192/3.28 |
| 2012/0266589 A1* | 10/2012 | Avins | F16F 15/1207 60/330 |
| 2013/0186724 A1* | 7/2013 | Miyahara et al. | 192/3.23 |

* cited by examiner

LOCK-UP DEVICE FOR FLUID TYPE POWER TRANSMISSION DEVICE

CROSS-REFERENCE TO THE RELATED APPLICATIONS

This U.S. national phase application claims priority to Japanese Patent Application No. 2010-234338 filed on Oct. 19, 2010. The entire disclosure of Japanese Patent Application No. 2010-234338 is hereby incorporated herein by reference

TECHNICAL FIELD

The present invention relates to a lock-up device, and particularly to a lock-up device for a fluid type power transmission device in use of mechanically coupling power from a front cover to a turbine of the fluid type power transmission device.

BACKGROUND ART

A torque converter as a fluid type power transmission device is embedded with a lock-up device in order to reduce fuel consumption. The lock-up device is disposed in a space produced between a turbine and a front cover, and is configured to mechanically couple the front cover and the turbine in order to directly transmitting torque therebetween.

In general, the lock-up device includes a piston and a damper mechanism. The piston is pressed onto the front cover by the action of hydraulic pressure, and torque is transmitted to the piston from the front cover. On the other hand, the damper mechanism includes: an output-side member coupled to the turbine; and a plurality of torsion springs for elastically coupling the piston and the output-side member. Moreover, the torque transmitted to the piston is transmitted to the output-side member through the plurality of torsion springs, and is further transmitted to the turbine.

Incidentally, PTL 1 describes a lock-up device that an inertia member is attached to the output-side member in order to inhibit variation in engine rotation. In the lock-up device described in PTL 1, the inertia member is attached to the output member fixed to the turbine, while being rotatable relatively thereto. Further, torsion springs are disposed as elastic members between the output member and the inertia member.

In the lock-up device of PTL 1, the inertia member is coupled to the output member through the torsion springs. Therefore, the inertia member and the torsion springs function as a dynamic damper, and these components attenuate variation in rotational speed of the output-side member (turbine).

CITATION LIST

Patent Literature

PTL 1: Japan Laid-open Patent Application Publication No. JP-A-2009-293671

SUMMARY

Technical Problems

Recent passenger vehicles have been demanded to suppress as low as possible a rotational speed at which the front cover and the turbine are coupled (hereinafter referred to as "a lock-up rotational speed") in order to enhance fuel consumption. However, in general, the engine rotational speed widely varies in a lower engine rotational speed range. Therefore, when the lock-up rotational speed is set to below, the output-side rotational speed inevitably varies more widely. In view of this, with use of such lock-up device having the inertia member as described in PTL 1, variation in rotation can be inhibited even when the lock-up rotational speed is set to be, for instance, roughly 1,200 rpm.

However, a drawback is produced that the rotational speed widely varies at around 1,600 rpm where the lock-up device having the inertia member is designed to have a specification of minimizing variation in output-side rotational speed at around 1,200 rpm. The characteristic of variation in rotational speed, i.e., at around what rotational speed variation in rotational speed is minimized and maximized, is mainly attributed to the magnitude of hysteresis torque to be produced between the output member and the inertia member.

The lock-up device described in PTL 1 is embedded with a hysteresis torque generating mechanism, but variation in output-side rotational speed cannot be inhibited in a wide rotational speed range.

It is an advantage of the present invention to inhibit variation in output-side rotational speed in a wide rotational speed range even when the lock-up rotational speed is set to be low.

Solution to Problems

A lock-up device for a fluid type power transmission device according to a first invention is a device configured to mechanically couple a power from a front cover to a turbine of the fluid type power transmission device. The lock-up device includes: a piston configured to be pressed onto the front cover; and an output-side unit disposed to be unitarily rotatable with the turbine. The output-side unit includes: an output member fixed to the turbine; an inertia member disposed to be rotatable relatively to the output member; an elastic member elastically coupling the inertial member and the output member in a rotational direction; and a hysteresis torque generating mechanism. The hysteresis torque generating mechanism is disposed between the inertia member and the output member and is configured to generate a variable hysteresis torque between the inertial member and the output member.

In the present device, power is transmitted to the output-side unit through the piston pressed onto the front cover. In the output-side unit, power is outputted from the output member fixed to the turbine. At this time, the inertia member is coupled to the output member through the elastic member, and variation in output-side rotational speed can be inhibited by the inertia member.

Here, the output member and the inertia member are rotated relatively to each other, and hysteresis torque generated by the hysteresis torque generating mechanism acts between the both members. A characteristic of variation in output-side rotational speed varies depending on the magnitude of the hysteresis torque.

In view of the above, according to the present invention, hysteresis torque is configured to vary depending on rotational speed ranges, and variation in output-side rotational speed is configured to be reduced in a wide rotational speed range. Therefore, variation in rotational speed can be inhibited in a wide rotational speed range even when the lock-up rotational speed is set to be low.

A lock-up device for a fluid type power transmission device according to a second invention relates to the lock-up device according to the first invention, and wherein the hysteresis torque generating mechanism is configured to: generate a first hysteresis torque in a low rotational speed range; and generate a second hysteresis torque greater than the first hysteresis torque in intermediate to high rotational speed ranges.

When small hysteresis torque is generated between the output member and the inertia member, variation in output-side rotational speed is reduced in the low rotational speed range. Contrarily to this, when large hysteresis torque is generated therebetween, variation in output-side rotational speed is reduced in the intermediate rotational speed range. In view of the above, according to the present invention, the first hysteresis torque is configured to be generated in the low rotational speed range, whereas the greater second hysteresis torque is configured to be generated in the intermediate to high rotational speed ranges. Therefore, variation in output-side rotational speed can be inhibited in a wide rotational speed range.

A lock-up device for a fluid type power transmission device according to a third invention relates to the lock-up device according to the second invention, and wherein the output member includes: a driven plate to which a power is inputted from the piston; and a hub flange fixed to an inner peripheral portion of the driven plate and fixed to the turbine. Further, the inertia member includes: an annular inertia plate elastically coupled to the hub flange through the elastic member in the rotational direction; and an inertia block fixed to an outer peripheral portion of the inertial plate. Yet further, the hysteresis torque generating mechanism is disposed between an outer periphery of the hub flange and an inner peripheral portion of the inertial plate.

Here, the hysteresis torque generating mechanism is disposed between the outer periphery of the hub flange and the inner peripheral portion of the inertial plate. Therefore, extension in an axial space can be avoided.

A lock-up device for a fluid type power transmission device according to a fourth invention relates to the lock-up device according to the third invention, and wherein the hysteresis torque generating mechanism includes a plurality of sliders configured to be rotated with the hub flange and be radially movable, and the sliders are configured to be moved radially outwards by a centrifugal force and make contact with the inertia plate when the hub flange is rotated at a predetermined rotational speed or greater.

Here, hysteresis torque, configured to vary depending on the rotational speed, can be generated using the centrifugal force acting on the sliders. Therefore, the hysteresis torque generating mechanism can be implemented with a simple structure.

A lock-up device for a fluid type power transmission device according to a fifth invention relates to the lock-up device according to the fourth invention, and wherein the hysteresis torque generating mechanism further includes a pressing mechanism configured to press the plurality of sliders onto the inertia plate.

To generate large hysteresis torque, the sliders are required to be enlarged for increasing the centrifugal force thereof. However, a large occupied space is required for the purpose. In contrast, when the sliders are reduced for reduction in size, the centrifugal force acting on the sliders is also reduced. Thus, large hysteresis torque cannot be generated.

In view of the above, according to the present invention, the pressing mechanism configured to press the slider is further provided for generating large hysteresis torque even with small sliders.

A lock-up device for a fluid type power transmission device according to a sixth invention relates to the lock-up device according to the fifth invention, and wherein the pressing mechanism includes a plurality of rollers that are disposed between the hub flange and the respective plurality of sliders and are configured to press the plurality of sliders onto the inertia plate by variation in rotation.

Here, the sliders can be strongly pressed onto the inertia plate with a simple structure, and large hysteresis torque can be easily generated.

A lock-up device for a fluid type power transmission device according to a seventh invention relates to the lock-up device according to any of the first to sixth inventions, and further includes an elastic member elastically coupling the piston and the output-side unit in the rotational direction.

Advantageous Effects of Invention

According to the present invention as described above, the lock-up rotational speed can be set to be as low as possible, and in addition, variation in the turbine rotation can be inhibited in a wide rotational speed range. Therefore, low fuel consumption can be achieved.

DETAILED DESCRIPTION OF THE PREFERRED EMBODIMENTS

[Entire Structure]

Figure 1:
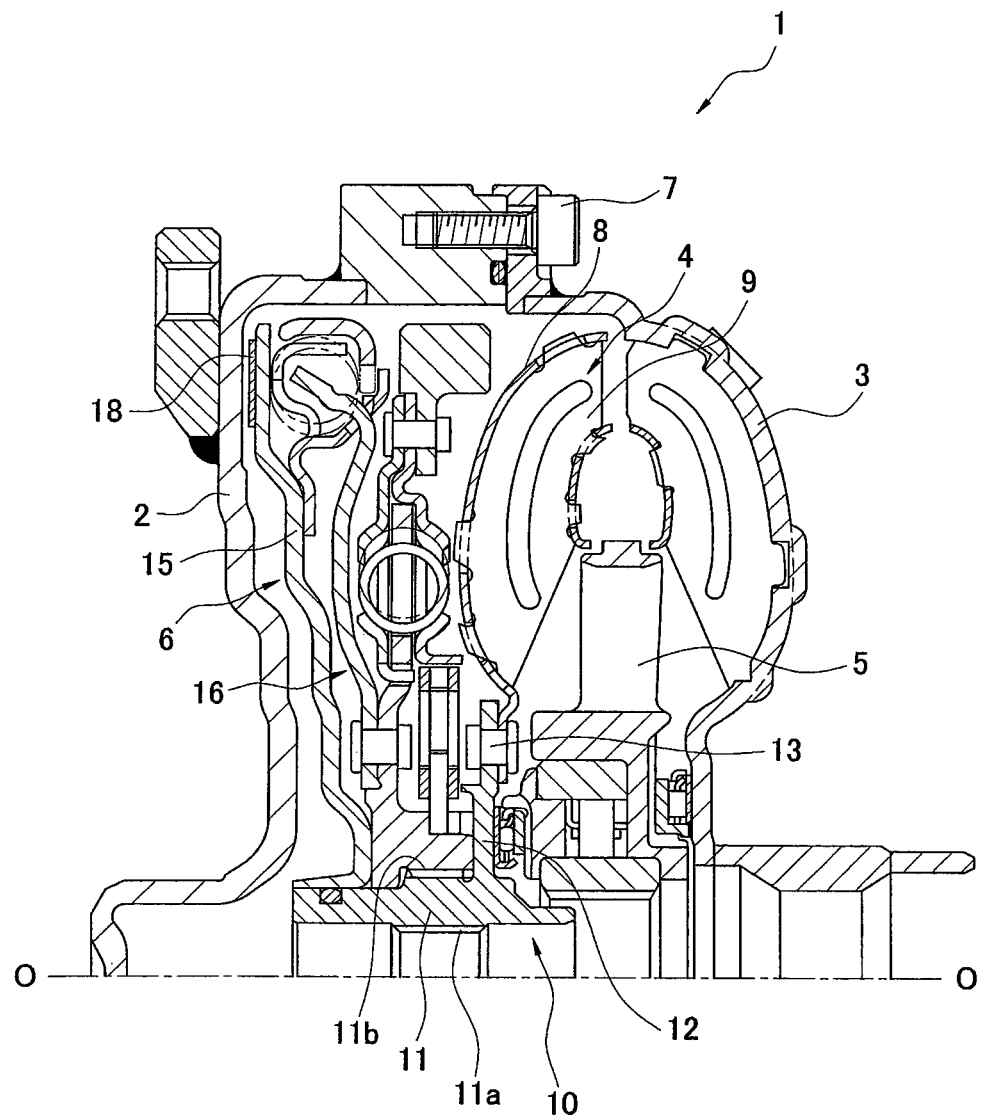
FIG. 1 is a cross-sectional structural view of a torque converter equipped with a lock-up device according to an exemplary embodiment of the present invention.

FIG. 1 illustrates a torque converter as a fluid type power transmission device according to an exemplary embodiment of the present invention. In FIG. 1, an engine is disposed on the left side, whereas a transmission is disposed on the right side. A line O-O depicted in FIG. 1 is a rotary axis line of the torque converter.

A torque converter 1 is a device for transmitting power from a crankshaft of the engine to an input shaft of the transmission. The torque converter 1 mainly includes a front cover 2 into which power is inputted, an impeller 3, a turbine 4, a stator 5 and a lock-up device 6.

The outer peripheral portion of the front cover 2 and that of the impeller 3 are fixed to each other by bolts 7. The front cover 2 and the impeller 3 form a fluid chamber. The turbine 4 is disposed in opposition to the impeller 3 within the fluid chamber. The turbine 4 includes: a turbine shell 8; a plurality of turbine blades 9 fixed to the inner portion of the turbine shell 8; and a turbine hub 10 fixed to the inner peripheral portion of the turbine shell 8. The turbine hub 10 has: a tubular portion 11 extended in the axial direction; and a disc-shaped flange 12 extended radially outwards from the tubular portion 11. Further, the inner peripheral portion of the turbine shell 8 is fixed to the outer peripheral portion of the flange 12 by rivets 13. It should be noted that the tubular portion 11 of the turbine hub 10 has: a spline hole 11a formed in the inner peripheral portion thereof; and a spline shaft 11b formed on the outer peripheral portion thereof. Further, the input shaft of the transmission (not illustrated in the figures) is coupled to the spline hole 11a. On the other hand, the stator 5 is a mechanism for regulating the flow of operating oil from the turbine 4 to the impeller 3. The stator 5 is disposed between the impeller 3 and the turbine 4.

[Lock-Up Device 6]

Figure 2:
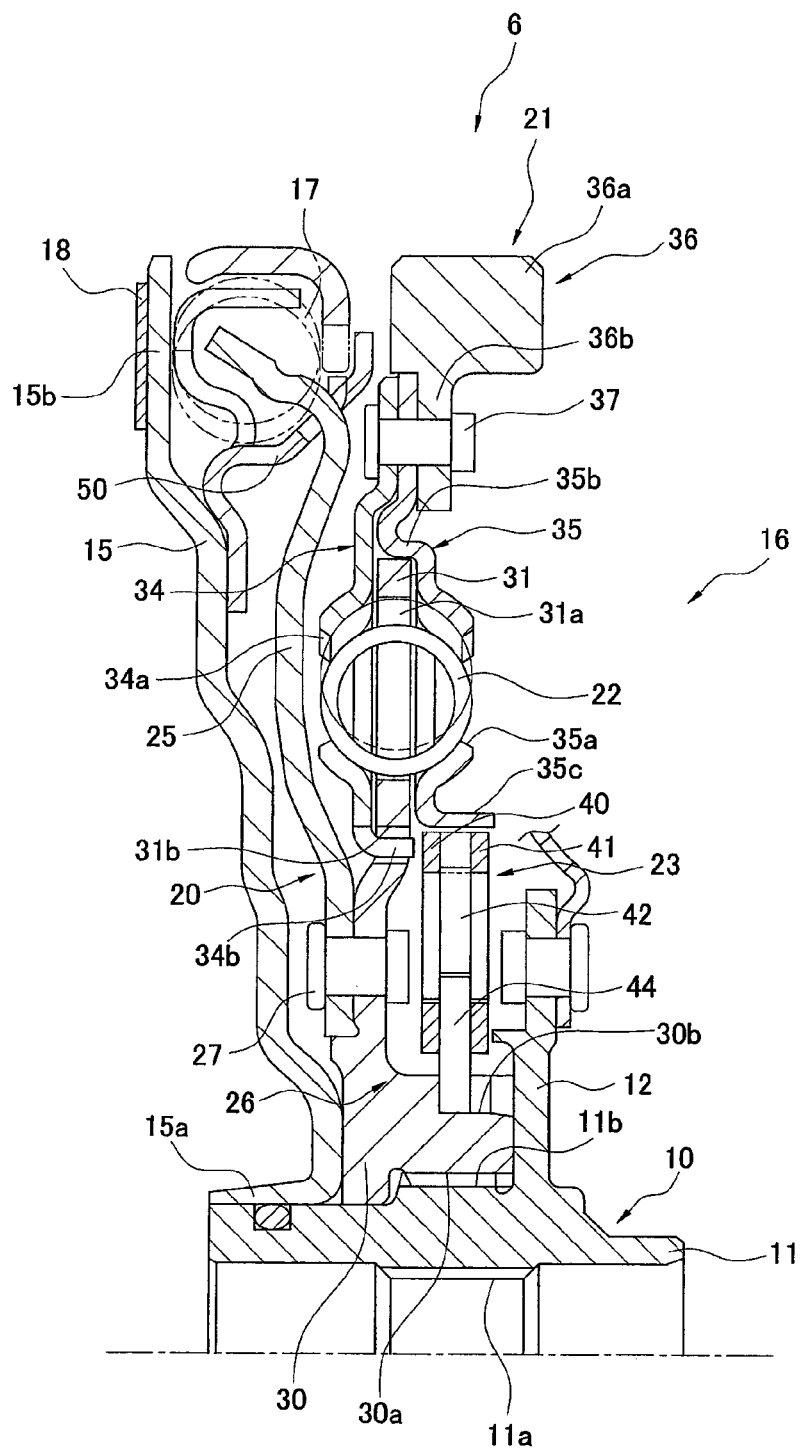
FIG. 2 is a cross-sectional structural view of the lock-up device.

FIG. 2 illustrates the lock-up device 6 taken out from the torque converter 1. The lock-up device 6 is a device for mechanically coupling the front cover 2 and the turbine 4 when the engine rotational speed reaches a predetermined rotational speed (lock-up rotational speed). As illustrated in FIG. 1, the lock-up device 6 is disposed between the front cover 2 and the turbine 4. The lock-up device 6 includes a piston 15, an output-side unit 16 and a plurality of first torsion springs (first elastic members) 17.

<Piston 15>

The piston 15 has a tubular portion 15a on the inner peripheral portion thereof, and the tubular portion 15a is formed by bending the inner peripheral portion towards the engine. Further, the tubular portion 15a is supported by the outer peripheral surface of the tubular portion 11 of the turbine hub 10, while being slidable in the axial direction and the rotational direction. Further, an annular friction member 18, configured to be pressed onto the lateral face of the front cover 2, is fixed to an outer peripheral portion 15b of the piston 15.

<Output-Side Unit 16>

The output-side unit 16 includes an output member 20, an inertia member 21, a plurality of second torsion springs (second elastic members) 22 and a hysteresis torque generating mechanism 23.

—Output-Member 20—

The output member 20 is formed by a driven plate 25 and a hub flange 26. The driven plate 25 and the hub flange 26 are fixed to each other by rivets 27.

The driven plate 25 is a roughly disc-shaped member that the outer peripheral portion thereof is slanted towards the engine. Further, the tip of the outer peripheral portion is engaged with the ends of the first torsion springs 17.

Figure 3:
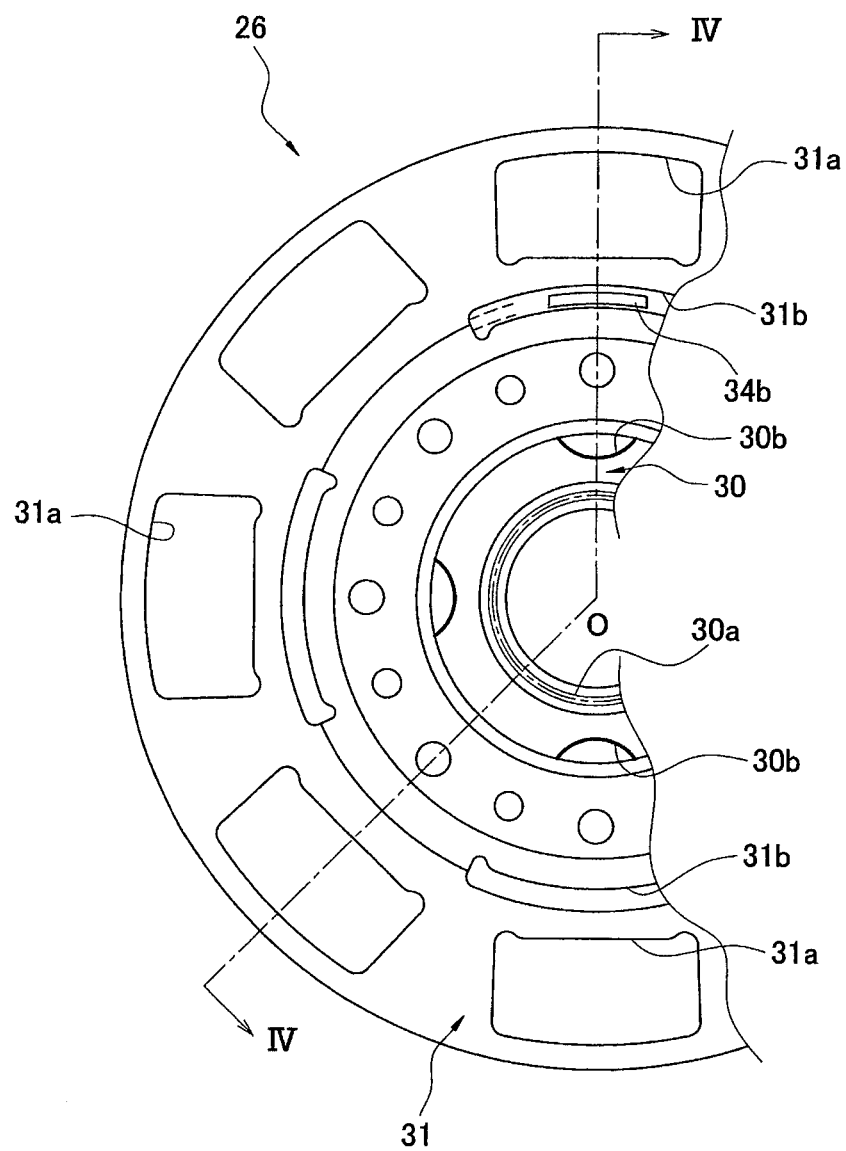
FIG. 3 is a partial front view of a hub flange.
Figure 4:
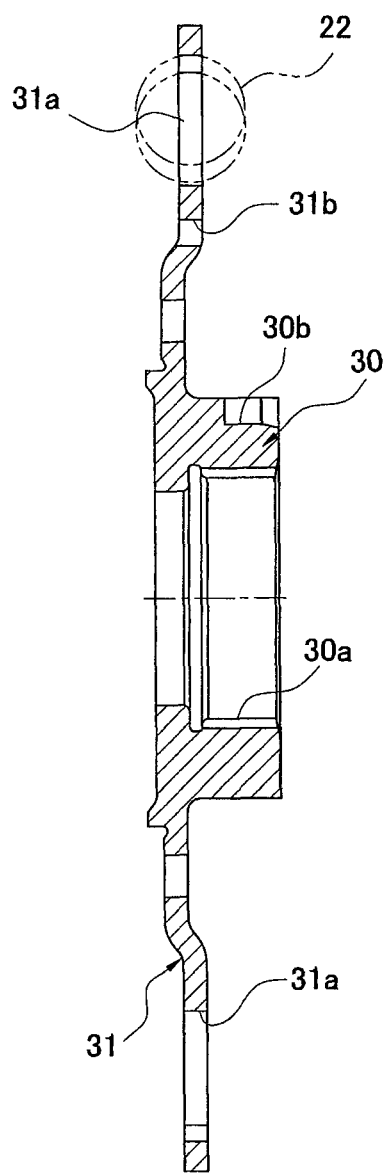
FIG. 4 is a cross-sectional view of FIG. 3 taken along a line IV-IV.

As illustrated in FIG. 3 and FIG. 4 that is a cross-sectional view of FIG. 3 taken along a line IV-IV, the hub flange 26 has a boss 30 and a flange 31 extended radially outwards from the outer periphery of an axial end of the boss 30. The boss 30 has a spline hole 30a formed in the inner peripheral portion thereof. The spline hole 30a is engaged with the spline shaft 11b of the turbine hub 10. Further, the boss 30 has four circular-arc recesses 30b formed on the outer peripheral surface thereof at equal angular intervals (90-degree intervals). The flange 31 has a plurality of window holes 31a formed in the outer peripheral portion thereof. The second torsion springs 22 are supported within the plural window holes 31a. A plurality of stopper cutouts 31b are formed on the inner peripheral side of the window holes 31a. Each stopper cutout 31b has a predetermined length in the circumferential direction.

—Inertia Member 21—

The inertia member 21 is a member functioning as a dynamic damper for further inhibiting variation in speed of rotation to be inputted thereto from the driven plate 25. The inertia member 21 is formed by first and second inertia plates 34 and 35 and an inertia block 36. The two inertia plates 34 and 35 and the inertia block 36 are fixed to each other by rivets 37.

The first and second inertia plates 34 and 35 are disposed in opposition to each other, while axially interposing therebetween the flange 31 of the hub flange 26. Both of the plate 34 and the plate 35 respectively have a plurality of second torsion spring supporting cutouts 34a and a plurality of second torsion spring supporting cutouts 35a in the radially intermediate portions thereof. The second torsion springs 22 are supported within the cutouts 34a and 35a.

Further, the first inertia plate 34 has a plurality of stopper bending portions 34b on the inner peripheral end thereof. The stopper bending portions 34b are formed by axially bending the inner peripheral end of the first inertia plate 34 towards the transmission. The stopper bending portions 34b are inserted into the stopper cutouts 31b formed in the flange 31 of the hub flange 26. Accordingly, the both inertia plates 34 and 35 and the inertia block 36 are rotatable relatively to the hub flange 26 within a range of the circumferential length of each stopper cutout 31b (an angular range).

The second inertia plate 35 has a positioning recess 35b on the outer peripheral side of the cutouts 35a. The positioning recess 35b is axially recessed towards the engine, and the inner peripheral surface thereof is contactable with the outer peripheral end surface of the flange 31 of the hub flange 26. Further, the inner peripheral end edge of the second inertia plate 35 is axially bent towards the transmission, and thereby, a tubular contact portion 35c is formed.

The inertia block 36 is an annular member, and has a main body 36a and an attachment portion 36b formed on the inner peripheral side of the main body 36a. Further, the attachment portion 36b is fixed to the both inertia plates 34 and 35 by the rivets 37 as described above.

—Hysteresis Torque Generating Mechanism 23—

The hysteresis torque generating mechanism 23 is disposed axially between the flange 31 of the hub flange 26 and the flange 12 of the turbine hub 10, while being disposed radially between the boss 30 of the hub flange 26 and the tubular contact portion 35c of the second inertia plate 35. The hysteresis torque generating mechanism 23 is a mechanism configured to generate a variable hysteresis torque between the hub flange 26 forming a part of the output member 20 and the second inertia plate 35 forming a part of the inertia member 21.

Figure 5:
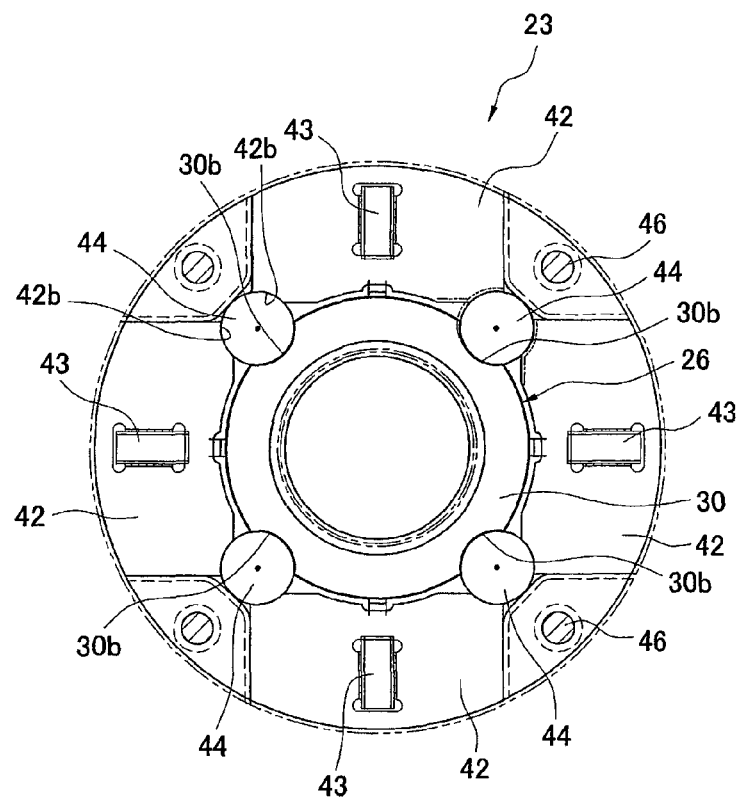
FIG. 5 is a front view of a hysteresis torque generating mechanism.
Figure 5:
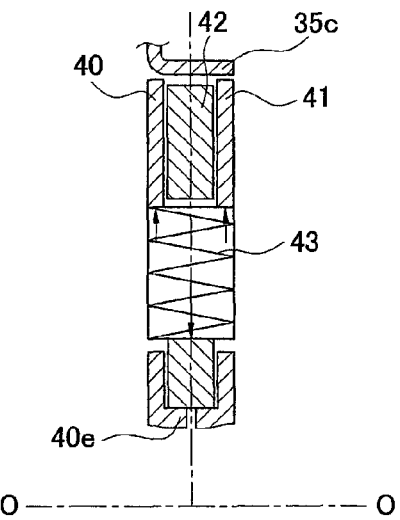

As illustrated in FIGS. 2 and 5, the hysteresis torque generating mechanism 23 includes a pair of side plates 40 and 41, four sliders 42 disposed between the pair of side plates 40 and 41, four springs 43 disposed correspondingly to the four sliders 42, and four rollers 44. It should be noted that FIG. 5(a) illustrates the hysteresis torque generating mechanism 23 that one of the side plates is taken out therefrom, whereas FIG. 5(b) is a partial cross-sectional view of FIG. 5(a).

The pair of side plates 40 and 41 has the same shape, and therefore, only one of them, i.e., the side plate 40 will be explained.

Figure 6:
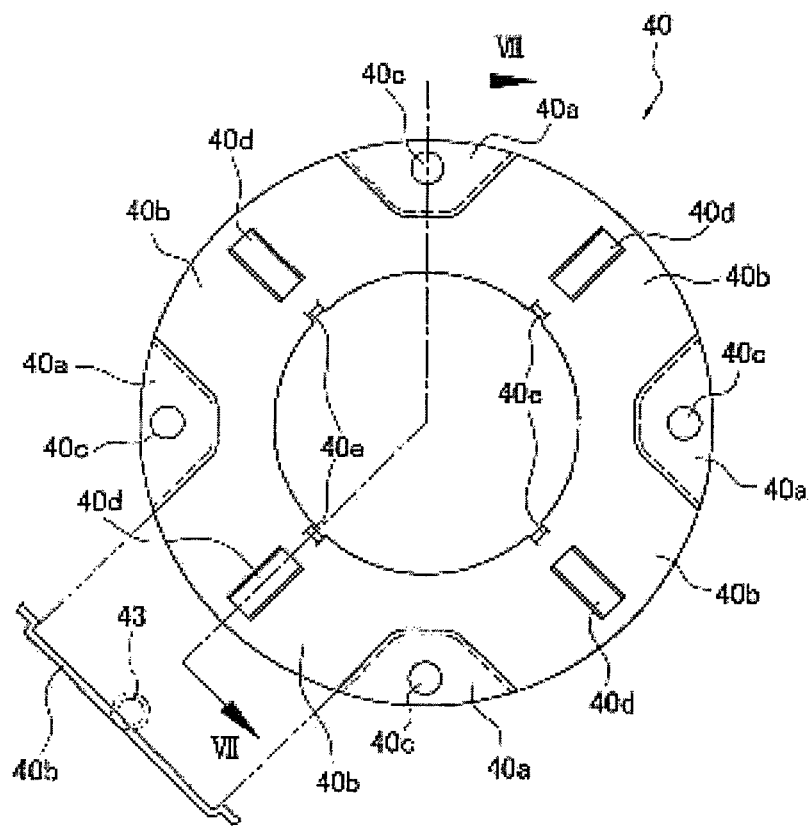
FIG. 6 is a front view of a side plate.
Figure 7:
FIG. 7 is a cross-sectional view of FIG. 6 taken along a line VII-VII.

As illustrated in FIG. 6 and FIG. 7 that is a cross-sectional view of FIG. 6 taken along a line VII-VII, the side plate 40 is formed in an annular shape and has four attachment portions 40*a* and four slider sliding portions 40*b*.

The four attachment portions 40*a* are formed on a part of the outer peripheral portion of the side plate 40 at equal angular intervals in the circumferential direction. As illustrated in FIG. 7, the attachment portions 40*a* are off-set from the slider sliding portions 40*b* in the axial direction. Each attachment portion 40*a* has an aperture 40*c* for rivet attachment. Further, the four attachment portions 40*a* make contact with and fixed to the attachment portions formed on the other of the side plates, i.e., the side plate 41 by the rivets 46 (see FIG. 5). In such structure, spaces (four divided spaces in this example) are produced between the slider sliding portions 40*b* of the slide plate 40 as one of the side plates and the slider sliding portions of the side plate 41 as the other of the side plates by the amount that the attachment portions 40*a* are off-set.

Each of the four slider sliding portions 40*b* is formed between adjacent two attachment portions 40*a*. Each slider sliding portion 40*b* has an opening 40*d* for accommodating each spring 43. Further, each slider sliding portion 40*b* has a bent portion 40*e* on the inner peripheral end thereof in order to hold each spring 43.

Figure 8:
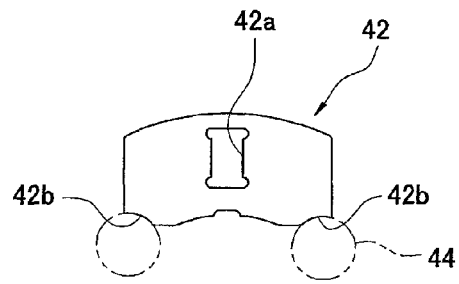
FIG. 8 is a front view of a slider.

Each of the four sliders 42 is interposed between the slider sliding portions of the pair of the side plates 40 and 41, and is radially slidable along the surfaces thereof. Further, each slider 42 is restricted from circumferentially moving by the lateral surfaces of the attachment portions 40*a* of the side plates 40 and 41. As illustrated in FIG. 8, each slider 42 has roughly the same shape as each slider sliding portion 40*b*. The outer peripheral portion thereof has a circular-arc shape, and is contactable with the inner peripheral surface of the tubular contact portion 35*c* formed in the inner peripheral portion of the second inertia plate 35. Further, each slider 42 has an opening 42*a* in a position corresponding to the opening 40*d* of each slider sliding portion 40*b* in order to accommodate each spring 43. Yet further, each slider 42 has circular-arc recesses 42*b* on the both circumferential ends of the inner peripheral portion thereof for allowing a part of the outer peripheral surface of each roller 44 to makes contact with each circular-arc recess 42*b*.

As illustrated in FIGS. 5(*a*) and 5(*b*), the four springs 43 are respectively accommodated in the corresponding pairs of openings 40*d* and 42*a* of the slider sliding portions 40*b* and the sliders 42. A radially inner side end of each spring 43 makes contact with each slider 42, while a radially outer side end of each spring 43 makes contact with the side plates 40 and 41. When the lock-up device 6 is not rotated (i.e., when centrifugal force is not applied), each slider 42 is urged radially inwards by each spring 43 without making contact with the tubular contact portion 35*c* of the second inertia plate 35.

As illustrated in FIG. 5, the four rollers 44 are disposed on the inner peripheral side of the sliders 42. Specifically, each roller 44 is disposed among the circular-arc recesses 42*b* of two adjacent sliders 42 and each circular-arc recess 30*b* formed on the boss 30 of the hub flange 26.

<First Torsion Springs 17>

As illustrated in FIG. 2, the plural first torsion springs 17 are members for elastically coupling a drive plate 50 fixed to the piston 15 and the driven plate 25 in the rotational direction. The first torsion springs 17 are supported by a plurality of members such as the drive plate 50, while being restricted from moving in the axial direction and the radial direction.

[Action]

An action of the torque converter in itself will be briefly explained.

During rotation of the front cover 2 and the impeller 3, the operating oil flows from the impeller 3 to the turbine 4, and power is transmitted from the impeller 3 to the turbine 4 through the operating oil. The power transmitted to the turbine 4 is transmitted to the input shaft (not illustrated in the figures) through the turbine hub 10.

When the rotational speed of the input shaft reaches a predetermined rotational speed, transmission of power is started through the lock-up device 6. Specifically, the piston 15 is moved towards the engine by variation in hydraulic pressure, and the friction member 18 of the piston 15 is pressed onto the front cover 2. As a result, the piston 15 is unitarily rotated with the front cover 2, and power is transmitted from the front cover 2 to the output-side unit 16 through the piston 15, the first torsion springs 17 and so forth.

[Action of Output-Side Unit]

In the output-side unit 16, the power inputted into the driven plate 25 is transmitted to the turbine hub 10 through the hub flange 26. At this time, the hub flange 26 is provided with the inertia member 21, and therefore, variation in rotation of the engine can be effectively inhibited. In this regard, detailed explanation will be hereinafter made.

Figure 9:
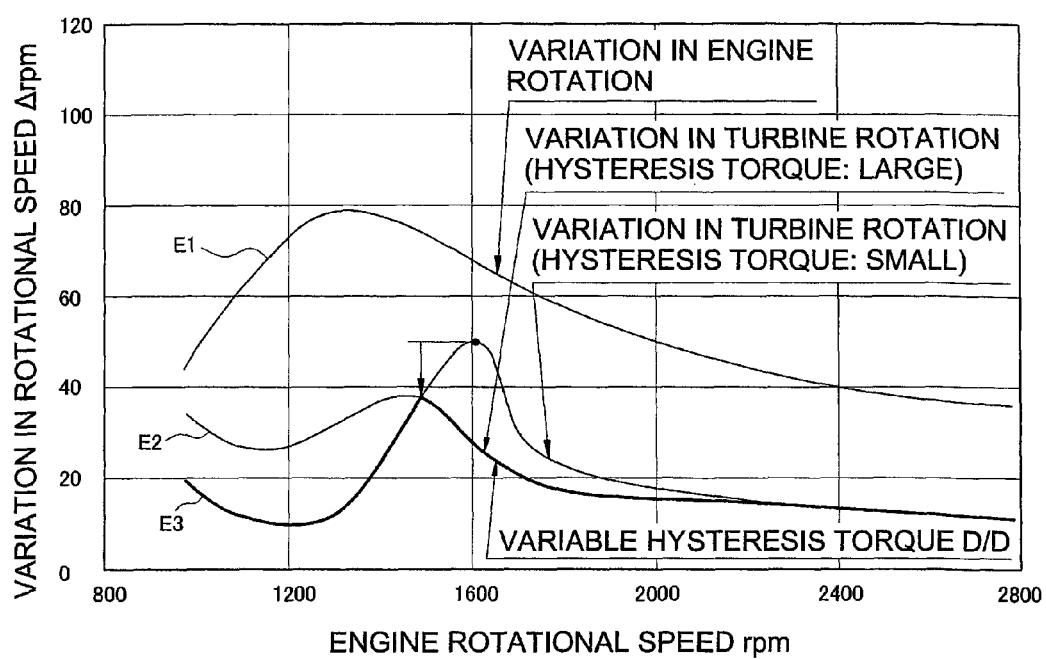
FIG. 9 is a characteristic diagram of engine rotational speed and variation in rotational speed.

As represented in FIG. 9, in general, when the rotational speed of an engine is reduced, variation in rotation of the engine to be caused by variation in combustion is increased (a characteristic E1). At this time, where an inertia member, i.e., a dynamic damper is not provided, variation in speed of rotation to be outputted from a torque converter is gradually increased when the engine speed is reduced. In contrast, where a dynamic damper is provided as with the present exemplary embodiment, it is possible to reduce variation in rotational speed of a turbine as an output-side component at around a specific engine speed (around 1,200 rpm in the example of FIG. 9) (characteristics E2 and E3).

A difference between the characteristics E2 and E3 in a low rotational speed range is attributed to the magnitude of a hysteresis torque in the hysteresis torque generating mechanism 23. In other words, the characteristic E2 relates to a case that a hysteresis torque is relatively large, whereas the characteristic E3 relates to a case that a hysteresis torque is relatively small. In the characteristic E2, variation in rotational speed of the turbine is reduced when the engine is rotated at around a rotational speed less than 1,200 rpm, is then maximized at around 1,500 rpm, and is gradually reduced in a rotational speed range greater than around 1,500 rpm. On the other hand, in the characteristic E3, variation in rotational speed of the turbine indicates the minimum value less than that of the characteristic E2 around when the engine rotational speed exceeds 1,200 rpm, and indicates the maximum value greater than that of the characteristic E2 at around 1,600 rpm.

As is obvious from these characteristics, variation in rotational speed of the turbine is smaller in a low rotational speed range of the engine rotational speed when a hysteresis torque is smaller, whereas variation in rotational speed of the turbine is smaller in an intermediate engine rotational speed range when a hysteresis torque is larger. On the other hand, variation in rotational speed of the turbine is less affected by the magnitude of a hysteresis torque in a high engine rotational speed range.

In view of the above, the hysteresis torque generating mechanism 23 according to the present exemplary embodiment is configured to change a hysteresis torque depending on rotational speed ranges. Specifically, a hysteresis torque to be generated by the hysteresis torque generating mechanism 23 becomes small in a low engine rotational speed range and becomes large in intermediate and high engine rotational speed ranges.

[Action of Hysteresis Torque Generating Mechanism]

Figure 10:
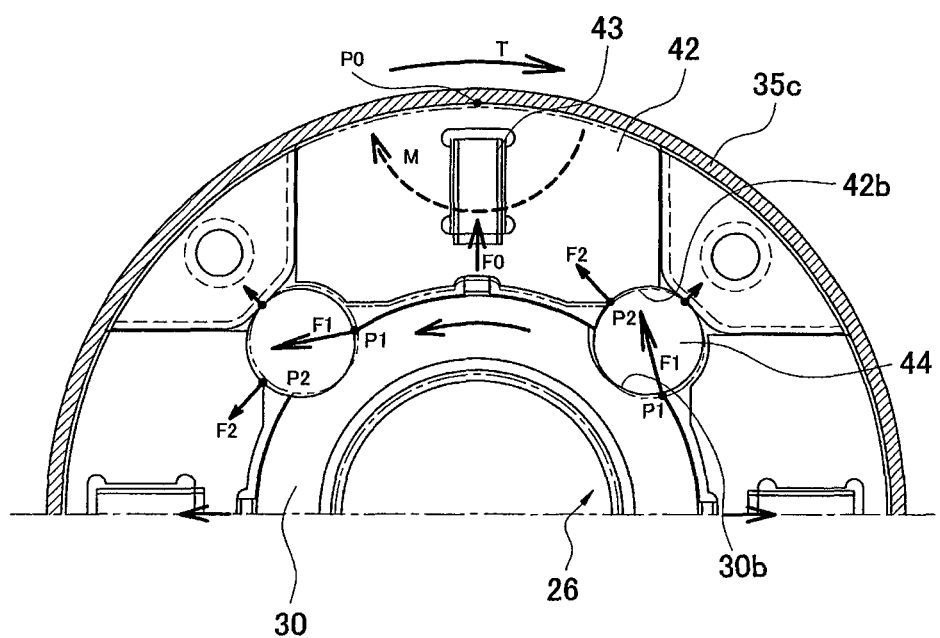
FIG. 10 is an actuation principle diagram for explaining an action of the hysteresis torque generating mechanism.

Using FIG. 10, explanation will be made for an action that a hysteresis torque varies depending on the rotational speed ranges.

First, in the low rotational speed range, a centrifugal force F0 acting on each slider 42 is relatively small. Therefore, each slider 42 is urged radially inwards by its relevant spring 43, while the outer peripheral surface of each slider 42 does not make contact with the tubular contact portion 35c of the second inertia plate 35. Therefore, a hysteresis torque is relatively small. In other words, only a hysteresis torque exists that is attributed to friction among respective components.

When the rotational speed is increased, the centrifugal force F0 acting on each slider 42 is increased. When such large centrifugal force F0 acts on each slider 42, each slider 42 is moved to the outer peripheral side against the urging force by its relevant spring 43. Then, the outer peripheral surface of each slider 42 makes contact with the tubular contact portion 35c of the second inertia plate 35 at around a point P0. At this time, while variation in rotational speed is caused, the hub flange 26 (the boss 30 in FIG. 10) and the tubular contact portion 35c are rotated in reverse phases. Therefore, each slider 42, making contact with the tubular contact portion 35c, receives a moment M, and accordingly, attempts to rotate in the clockwise direction in FIG. 10. On the other hand, each roller 44 makes contact with the hub flange 26 at a point P1, and receives a force F1 at the contact point P1. Further, each roller 44 makes contact with each slider 42 at a point P2, and thereby, each slider 42 receives a force F2 from each roller 44. Accordingly, each slider 42 is supposed to further receive a clockwise moment. As a result, the outer peripheral surface of each slider 42 is supposed to be strongly pressed onto the tubular contact portion 35c.

As described above, a hysteresis torque, which is greater than that to be generated in the low rotational speed range, is supposed to be generated between the inertial member 21 (the second inertia plate 35) and the hub flange 26, which are rotated relatively to each other.

With the aforementioned structure, as represented in FIG. 9, the characteristic of variation in rotational speed of the turbine becomes the characteristic E3 in the low rotational speed range, and becomes the characteristic E2 in the intermediate to high rotational speed ranges. Therefore, variation in rotational speed of the turbine can be suppressed low in the entire engine speed ranges.

[Features]

(1) A small hysteresis torque is generated in the low rotational speed range, whereas a larger hysteresis torque is generated in the intermediate to high rotational speed ranges. Therefore, variation in rotational speed of the turbine can be inhibited in a wide rotational speed range.

(2) The hysteresis torque generating mechanism 23 is disposed between the outer periphery of the hub flange 26 and the inner peripheral portion of the inertia plate 35. Therefore, the device can be formed with a compact size in the axial direction.

(3) A hysteresis torque is caused to vary using the centrifugal force acting on the sliders 42. Therefore, with a simple structure, different hysteresis torques can be generated depending on rotational speed ranges.

(4) The sliders 42 are configured to be pressed onto the inertia plate 35 by the rollers 44. Therefore, a large hysteresis torque can be generated with small-size siders and with a simple structure.

[Other Exemplary Embodiments]

The present invention is not limited to the exemplary embodiment as described above, and a variety of changes or modifications can be made without departing from the scope of the present invention.

(a) The structure of the hysteresis torque generating mechanism is not limited to that described in the aforementioned exemplary embodiment. Any structure can be applied as long as a hysteresis torque to be generated varies depending on rotational speed ranges.

(b) The aforementioned exemplary embodiment has been explained by exemplifying the torque converter as a fluid type power transmission device. However, a fluid coupling without a stator can be applied as a fluid type power transmission device.

INDUSTRIAL APPLICABILITY

According to the present invention, it is possible to set the lock-up rotational speed of the lock-up device as low as possible. In addition, variation in turbine rotation can be inhibited in a wide rotational speed range. Therefore, low fuel consumption can be achieved.

The invention claimed is:

1. A lock-up device for a fluid type power transmission device, the lock-up device configured to mechanically couple a power from a front cover to a turbine of the fluid type power transmission device, the lock-up device comprising:
   a piston configured to be pressed onto the front cover; and
   an output-side unit disposed to be unitarily rotatable with the turbine,
   the output-side unit including:
      an output member fixed to the turbine,
      an inertia member disposed to be rotatable relatively to the output member, the inertia member including an annular inertia plate,
      a first elastic member elastically coupling the inertia member and the output member in a rotational direction, and
   a hysteresis torque generating mechanism disposed on an inner peripheral side of an engagement portion between the piston and the front cover and between the inertia member and the output member, the hysteresis torque generating mechanism being configured to engage the inertia plate to generate a variable hysteresis torque between the inertia member and the output member,
   the hysteresis torque generating mechanism including a plurality of sliders configured to be rotated with a hub flange and configured to be moved radially outwards by a centrifugal force and to contact the inertia plate when the hub flange is rotated at a predetermined rotational speed or greater.

2. The lock-up device for the fluid type power transmission device recited in claim 1, wherein
   the hysteresis torque generating mechanism is configured to generate a first hysteresis torque in a low rotational speed range, and generate a second hysteresis torque greater than the first hysteresis torque in a high rotational speed range,
   the high rotational speed range is higher than the low rotational speed range.

3. The lock-up device for the fluid type power transmission device recited in claim 2, wherein
- the output member includes a driven plate to which a power is inputted from the piston, and the hub flange fixed to an inner peripheral portion of the driven plate and fixed to the turbine,
- the annular inertia plate is elastically coupled to the hub flange through the first elastic member in the rotational direction, the inertia member including an inertia block fixed to an outer peripheral portion of the inertia plate, and
- the hysteresis torque generating mechanism is disposed between an outer periphery of the hub flange and an inner peripheral portion of the inertia plate.

4. The lock-up device for the fluid type power transmission device recited in claim 1, wherein
- the hysteresis torque generating mechanism further includes a pressing mechanism configured to press the plurality of sliders onto the inertia plate.

5. The lock-up device for the fluid type power transmission device recited in claim 4 wherein
- the pressing mechanism includes a plurality of rollers,
- the rollers are disposed between the hub flange and the respective plurality of sliders,
- the rollers are configured to press the plurality of sliders onto the inertia plate by variation in rotation.

6. The lock-up device for the fluid type power transmission device recited in claim 1, further comprising:
- a second elastic member elastically coupling the piston and the output-side unit in the rotational direction.

* * * * *